(12) United States Patent
Shindo et al.

(10) Patent No.: US 9,133,921 B2
(45) Date of Patent: Sep. 15, 2015

(54) BALL SCREW AND ASSEMBLING METHOD THEREOF

(75) Inventors: Masashi Shindo, Fujisawa (JP); Junji Minakuchi, Fujisawa (JP)

(73) Assignee: NSK Ltd., Tokyo (JP)

( * ) Notice: Subject to any disclaimer, the term of this patent is extended or adjusted under 35 U.S.C. 154(b) by 51 days.

(21) Appl. No.: 14/237,306

(22) PCT Filed: Aug. 1, 2012

(86) PCT No.: PCT/JP2012/004899
§ 371 (c)(1),
(2), (4) Date: Feb. 5, 2014

(87) PCT Pub. No.: WO2013/024575
PCT Pub. Date: Feb. 21, 2013

(65) Prior Publication Data
US 2014/0157927 A1    Jun. 12, 2014

(30) Foreign Application Priority Data

Aug. 17, 2011 (JP) ................................. 2011-178579
Oct. 26, 2011 (JP) ................................. 2011-234942

(51) Int. Cl.
*F16H 1/20* (2006.01)
*F16H 3/06* (2006.01)
(Continued)

(52) U.S. Cl.
CPC ........ *F16H 25/2214* (2013.01); *F16H 25/2006* (2013.01); *F16H 25/2209* (2013.01);
(Continued)

(58) Field of Classification Search
CPC . F16H 25/20; F16H 25/2006; F16H 57/0497; B23Q 11/125
USPC .......................... 74/89.3, 89.4, 89.44, 424.72
See application file for complete search history.

(56) References Cited

U.S. PATENT DOCUMENTS 3,630,327 A * 12/1971 Nelson ........................... 192/223
3,643,521 A * 2/1972 Nilsson ........................... 74/89.4

(Continued)

FOREIGN PATENT DOCUMENTS

JP            04-39354 U        4/1992
JP         2002-310258 A       10/2002

(Continued)

OTHER PUBLICATIONS

English translation of International Preliminary Report on Patentability dated Feb. 27, 2014 (5 pages).
International Search Report dated Sep. 25, 2012 w/ English translation (four (4) pages).
Japanese-language Written Opinion Dated Sep. 25, 2012 (three (3) pages).

*Primary Examiner* — William Kelleher
*Assistant Examiner* — Jake Cook
(74) *Attorney, Agent, or Firm* — Crowell & Moring LLP

(57) ABSTRACT

To improve workability and sealing performance of a coolant when a plurality of nuts in a ball screw are brought into contact with one another, the plurality of nuts being coupled to one another, assembled to one threaded shaft and cooled by flowing the coolant through through-holes formed in the plurality of nuts in axial directions of the plurality of nuts. The ball screw includes counterbores of the through-holes formed on opposing end faces of both of adjoining nuts, and a ring-shaped sealing member inserted thereto. The counterbores are formed such that a depth of one counterbore is larger than a length of the sealing member, and the a depth of the other counterbore is smaller than the length of the sealing member, and such that circumferential positions of the counterbores of the adjoining nuts face each other when a desired preload is exerted.

2 Claims, 6 Drawing Sheets

(51) Int. Cl.
    *F16H 1/24* (2006.01)
    *F16H 27/02* (2006.01)
    *F16H 29/02* (2006.01)
    *F16H 29/20* (2006.01)
    *F16H 55/02* (2006.01)
    *F16H 25/22* (2006.01)
    *F16H 57/04* (2010.01)
    *F16H 25/20* (2006.01)

(52) U.S. Cl.
    CPC ........ *F16H57/0412* (2013.01); *F16H 57/0497* (2013.01); *Y10T 29/49826* (2015.01); *Y10T 74/19744* (2015.01)

(56) References Cited

U.S. PATENT DOCUMENTS

| | | | |
|---|---|---|---|
| 4,795,172 A * | 1/1989 | Brande | 277/354 |
| 5,582,072 A * | 12/1996 | Yamaguchi et al. | 74/441 |
| 2003/0089187 A1* | 5/2003 | Liao | 74/424.81 |
| 2012/0144944 A1* | 6/2012 | Yamamoto et al. | 74/424.81 |
| 2012/0266703 A1* | 10/2012 | Chuo | 74/89.44 |

FOREIGN PATENT DOCUMENTS

| | | | |
|---|---|---|---|
| JP | 2010-133556 A | 6/2010 |
| JP | 3165323 U | 1/2011 |

* cited by examiner

BALL SCREW AND ASSEMBLING METHOD THEREOF

TECHNICAL FIELD

The present invention relates to a ball screw, in particular, to a ball screw in which a plurality of nuts assembled to one threaded shaft are coupled to one another, and the nuts are cooled by flowing a coolant through through-holes formed in the nuts in axial directions thereof.

BACKGROUND ART

Conventionally, in a ball screw including a threaded shaft and a nut which is in threaded engagement with the threaded shaft and relatively rotatable, point contact or surface contact occurs during relative rotation. Therefore, a cooling means (heat exchanger) is sometimes provided at the nut.

As such a cooling means, a cooling passage arranged in the nut of the ball screw for circulating the coolant is disclosed (see e.g., Patent Literature (hereinafter referred to as PTL) 1). The above document also discloses a cooling technique of a nut in the ball screw adopting a double-nut preload type. The above document also discloses a configuration having a spacer interposed between two nuts and an O-ring attached to a mating surface of each of the two nuts. Then, the two nuts are cooled by flowing the coolant through the through-holes formed in the nuts in axial directions thereof.

CITATION LIST

Patent Literature

PTL 1: JP 2010-133556 A

SUMMARY OF INVENTION

Technical Problem

In the configuration described in the above document, however, at the time of assembling, when the two nuts come into contact with each other in a state where the two nuts are assembled to one threaded shaft, the O-ring attached to the mating surface between the two nuts has to be pressed while rotating the nuts, because of the structure of the ball screw. Therefore, the O-ring may be sheared, thus, the sealing performance may be degraded. On the other hand, this disadvantage can be avoided by bringing the two nuts into contact with each other in a state where the two nuts are detached from the threaded shaft. This reduces the workability and increases the assembling time.

Accordingly, the present invention has been made in view of the above-mentioned disadvantages and it is an object of the present invention to provide a ball screw and an assembling method thereof, in which a plurality of nuts assembled to one threaded shaft are coupled to one another, and the nuts are cooled by flowing a coolant through through-holes formed in the nuts in the axial directions thereof, the ball screw being capable of improving the workability in bringing the plurality of nuts into contact with one another and the coolant sealing performance.

Solution to Problem

In order to solve the aforementioned problem, according to an aspect of the present invention, there is provided a ball screw having a threaded shaft and a plurality of nuts coupled to one another and assembled to the threaded shaft, the plurality of nuts being cooled by flowing a coolant through through-holes formed in the plurality of nuts in axial directions of the plurality of nuts, respectively. The ball screw includes counterbores of the through-holes formed on opposing end faces of both of adjoining nuts of the plurality of nuts, respectively, and a ring-shaped sealing member having two O-rings and inserted into the counterbores, the two O-rings being fitted on the ring-shaped sealing member from the outside such that the two O-rings are located within the counterbores of the adjoining nuts, respectively. A first depth of a first counterbore of the counterbores is larger than a total length of the sealing member, the first counterbore being formed in one of the adjoining nuts and a second depth of a second counterbore of the counterbores is smaller than the total length of the sealing member, the second counterbore being formed in the other of the adjoining nuts. Moreover, circumferential positions of the first counterbore and the second counterbore of the adjoining nuts are arranged to face each other at positions where a desired preload is exerted.

Additionally, in order to solve the aforementioned problem, according to another aspect of the present invention, there is provided an assembling method of a ball screw having a threaded shaft and a plurality of nuts coupled to one another and assembled to the threaded shaft, the plurality of nuts being cooled by flowing a coolant through through-holes formed in the plurality of nuts in axial directions of the plurality of nuts, respectively. The assembling method includes a step of using the ball screw according to the above aspect of the present invention, and assembling the plurality of nuts to the threaded shaft to bring the one of the adjoining nuts into contact with the other of the adjoining nuts in a state where an entirety of the sealing member is accommodated in the first counterbore formed on the one of the adjoining nuts, and a step of pushing the sealing member after the step of using, in a state where the first counterbore and the second counterbore of the trough-holes of the adjoining nuts face each other, from an end part of the first counterbore formed on the one of the adjoining nuts, the end part being opposite to a contact side between the adjoining nuts and located at an end of a through-hole of the through-holes, the through-hole being formed in the one of the adjoining nuts, to press the sealing member into the second counterbore of the other of the adjoining nuts facing the one of the adjoining nuts.

Advantageous Effects of Invention

According to a ball screw of an aspect of the present invention, the counterbores of the though-holes are formed on the opposing end faces of the adjoining nuts, and the ring-shaped sealing member having the two O-rings is inserted into the counterbores. The two O-rings are fitted on the ring-shaped sealing member from the outside such that the two O-rings are located within the counterbores of the adjoining nuts, respectively. Since the depth of the counterbore formed on the one of the adjoining nuts is larger than the total length of the sealing member, this counterbore can accommodate the entirety of the sealing member.

Then, the depth of the other counterbore is smaller than the total length of the sealing member, and the circumferential positions of the counterbores of the adjoining nuts are arranged to face each other at positions where the desired preload is exerted. Therefore, the two nuts can be brought into contact with each other in a state where the entirety of the sealing member is accommodated in the counterbore formed on the one of the two nuts. Then, in a state where the counterbores of the though holes of the adjoining nuts face each other, the sealing member can be pushed from the end part of the counterbore formed on the one of the two nuts, the end part being opposite to the contact side between the nuts and located at the end of through hole, so that the sealing member is pressed into the counterbore of the other of the two nuts facing the one of the two nuts.

At this time, since the depth of the other counterbore is smaller than the total length of the sealing member, the sealing member can be located at the position to link the adjoined nuts, by pushing the sealing member up to the position where the sealing member hits the bottom of the counterbore. Therefore, there is no possibility of shearing of the O-ring, resulting in a degradation of the sealing performance. In addition, the workability is improved when the adjoining nuts are brought into contact with each other in a state the adjoining nuts are assembled to the threaded shaft. Additionally, it is not necessary to detach each of the nuts from the threaded shaft. And it is possible to surely seal the coolant to prevent the leakage between a plurality of nuts. Therefore, the sealing performance of the coolant is improved when the adjoining nuts are brought into contact with each other in a state the adjoining nuts are assembled to the threaded shaft.

Additionally, an assembling method of a ball screw of an aspect of the present invention includes the step of using the ball screw of the above aspect of the present invention, and assembling the plurality of nuts to the threaded shaft to bring the one of the adjoining nuts into contact with the other of the adjoining nuts in a state where the entirety of the sealing member is accommodated in the counterbore formed on the one of the adjoining nuts, and the step of pushing the sealing member after the step of using, in a state where the counterbores of the trough-holes of the adjoining nuts face each other, from the end part of the counterbore formed on the one of the adjoining nuts, the end part being opposite to the contact side between the adjoining nuts and located at the end of the through-hole, so that the sealing member is pressed into the counterbore of the other of the adjoining nuts facing the one of the adjoining nuts. Therefore, it is not necessary to detach each of the nuts from the threaded shaft. And there is no possibility of shearing of the O-ring, resulting in a degradation of the sealing performance, thus it is possible to surely seal the coolant to prevent the leakage between a plurality of nuts, and the workability and the sealing performance of the coolant is improved when the plurality of nuts are brought into contact with one another in a state the plurality of nuts are assembled to the threaded shaft.

DESCRIPTION OF EMBODIMENTS

Hereinafter, an embodiment of the present invention will be described with reference to the attached drawings.

Figure 1:
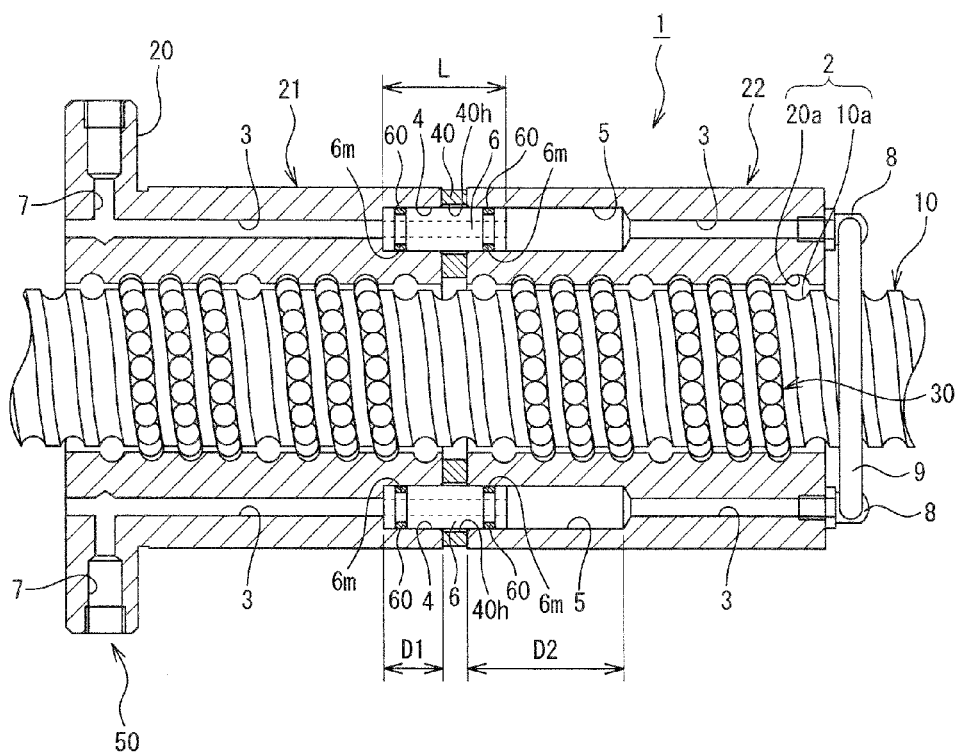
FIG. 1 is a view illustrative of an embodiment of a ball screw according to an aspect of the present invention, and is a view illustrative of a cross section including an axial line.

As illustrated in FIG. 1, a ball screw 1 according to the present embodiment adopts a double-nut preload type. The ball screw 1 includes a threaded shaft 10, and a first nut 21 and a second nut 22 which are in threaded engagement with the threaded shaft 10 via a plurality of rolling elements 30. An annular ring-shaped flange 20 is formed on an end of the first nut 21.

The first nut 21 and the second nut 22 are formed in a cylindrical shape having an internal diameter larger than the external diameter of the threaded shaft 10. A threaded groove 20a is formed on an inner circumferential surface of each of the nuts 21 and 22 such that the threaded groove 20a faces a threaded groove 10a spirally formed on an outer circumferential surface of the threaded shaft 10. The plurality of rolling elements 30 are rollable in a rolling passage 2 formed by the threaded groove 10a and the threaded groove 20a.

Figure 10A:
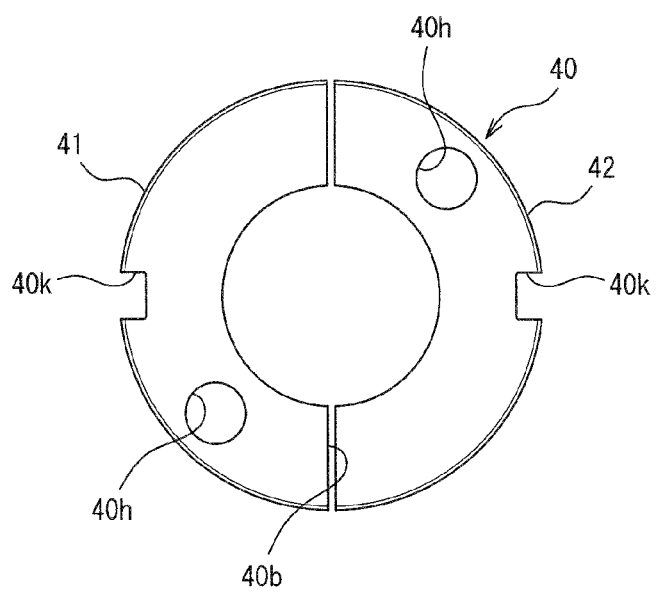
FIG. 10A is a front view illustrative of an embodiment of a spacer used in a ball screw according to an aspect of the present invention.
Figure 10B:
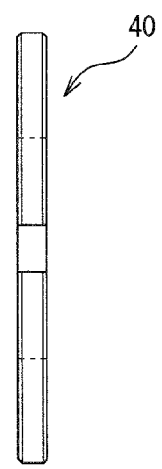
FIG. 10B is a side view illustrative of the embodiment of the spacer used in the ball screw according to the aspect of the present invention.

A spacer 40 for preventing the relative rotation between the first nut 21 and the second nut 22 is interposed between the first nut 21 and the second nut 22. The spacer 40 has a ring shape (having a two halves structure as illustrated in FIG. 10) having the same internal diameter as those of the first nut 21 and the second nut 22. By interposing the spacer 40 between the nuts 21 and 22, a preload is exerted on the plurality of rolling elements 30 assembled between the threaded groove 20a of each of the first nut 21 and the second nut 22 and the threaded groove 10a of the threaded shaft 10.

Two through-holes 3 penetrating through each of the nuts 21 and 22 in the axial directions thereof are formed on an upper position and a lower position at equal intervals in a circumferential direction. Two communication holes 7 as vertical holes communicating with the two through-holes 3, respectively, are formed on an upper position and a lower position at equal intervals. Moreover, coupling nipples 8 are mounted on the side of the two through-holes 3 of the second nut 22, respectively. Then, the coupling nipples 8 are connected to each other by a coupling pipe 9, thus the through-holes 3 of each of the nuts 21 and 23 are communicated with each other circularly as a whole, thereby constituting a circular flow passage. Then, a circulating apparatus, not illustrated, for circulating the coolant in the two through-holes 3 is connected via the communication holes 7 as vertical holes. The through-holes 3 are used as a passage of the coolant. The circulating apparatus, the through-holes 3 and the communication holes 7 as vertical holes constitute a cooling means 50, and the each of nuts 21 and 22 is cooled by circulating the coolant in the circular flow passage including the through-holes 3.

In the ball screw 1, counterbores 4 and 5 of the through-holes 3 of the two nuts 21 and 22 are coaxially formed on the opposing end faces of the nuts 21 and 22, respectively. Then, the ball screw 1 includes a ring-shaped (hollow cylindrical) sealing member 6 inserted into the counterbores 4 and 5. The external diameter of the sealing member 6 is slightly smaller than the internal diameters of the counterbores 4 and 5. Preferably, the facing gap in the radial direction is about 0.2 mm. Moreover, ring-shaped grooves 6m are formed on right and left ends of the sealing member 6, respectively. Two O-rings 60 are fitted in the grooves 6m from the outside such that the two O-rings 60 are located within the counterbores 4 and 5 of the nuts 21 and 22, respectively. The counterbores 4 and 5 facing each other of the two nuts 21 and 22 are arranged such that the circumferential positions of the counterbores 4 and 5 face each other at positions where a desired preload is exerted, when the spacer 40 is interposed.

Also, as to the interposed spacer 40, a through-hole 40h having the same diameter as those of the counterbores 4 and 5 is formed such that the through-hole 40h is located coaxially with the counterbores 4 and 5 of the adjoining nuts 21 and 22 in the axial direction, at the circumferential positions of the counterbores 4 and 5 facing each other when the desired preload is exerted.

For further details, the spacer 40 is provided with a pair of divided spacers 41 and 42 defined by halved ring-shaped members as illustrated in FIG. 10. Each of the divided spacers 41 and 42 has a key groove 40k at the center of the outer circumferential surface. Key grooves having a same shape are also formed at corresponding positions of the outer circumferential surfaces of the nuts 21 and 22, although not illustrated. Therefore, the rotation of the spacer 40 relative to the nuts 21 and 22 is prevented, in assembling, by placing a key member over the key grooves of both of the nuts 21 and 22, and the spacer 40. In this situation, the circumferential position where the through-hole 40h (two through-holes 40 in this example) is formed is between the key groove 40k and the dividing position 40b. In the example illustrated in FIG. 10, each through-hole 40h is formed at the center (a position almost equidistant in circumferential direction) between the key groove 40k and the dividing position 40b. Forming the through-hole 40h at such a position is preferable for preventing the formation of a thin portion in the divided spacers 41 and 42.

Then, referring back to FIG. 1, the depth D2 of the counterbore 5 of the second nut 22 as one of the nuts 21 and 22 is larger than the total length L of the sealing member 6 (D2>L). Therefore, the entirety of the sealing member 6 can be accommodated in the counterbore 5. On the other hand, the depth D1 of the counterbore 4 formed on the first nut 21 as the other of the nuts 21 and 22 is smaller than the total length L of the sealing member 6 (D1<L). Therefore, an end of the sealing member 6 protrudes into the second nut 22 side, even when the sealing member 6 is inserted up to the position of hitting the bottom of the counterbore 4.

Next, the assembling method of the ball screw 1 will be described.

Figure 2:
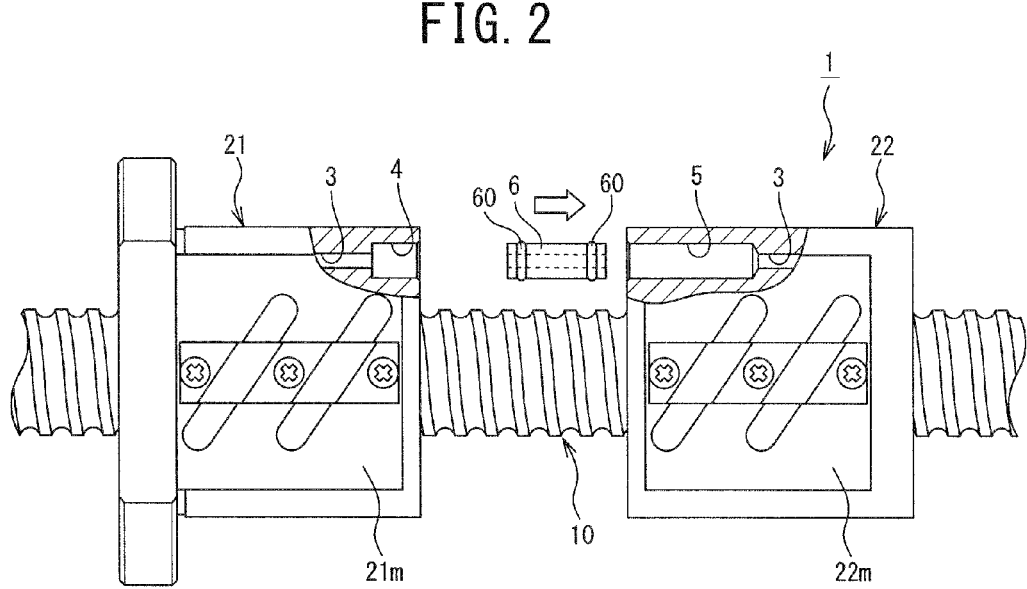
FIG. 2 is a view illustrative of an assembling method of the ball screw of FIG. 1 (an embodiment of an assembling method of a ball screw according to an aspect of the present invention, the same shall apply hereinafter)
Figure 3:
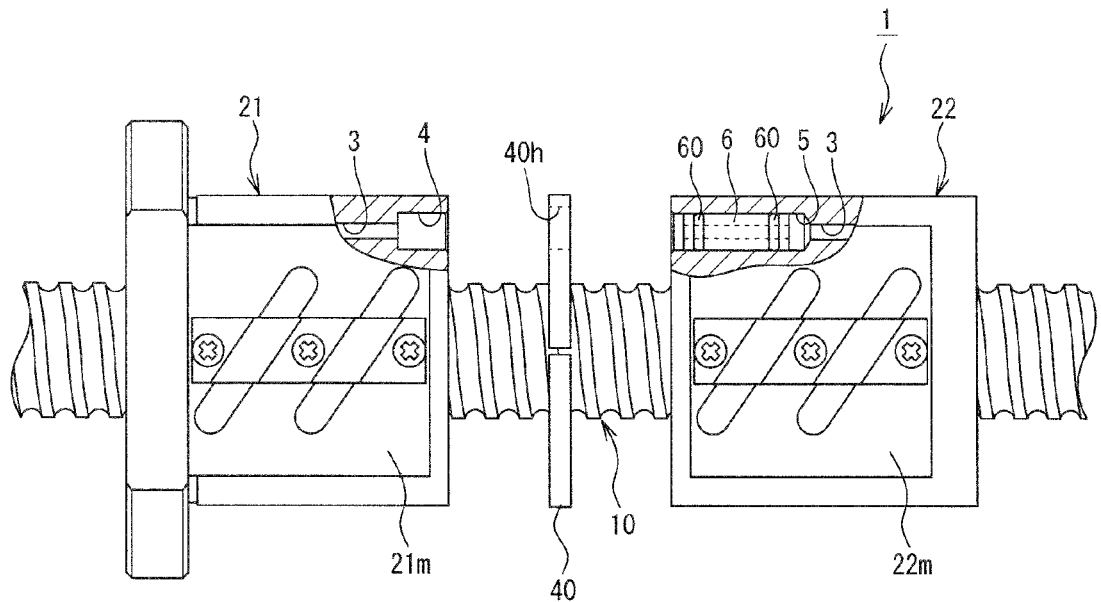
FIG. 3 is a view illustrative of the assembling method of the ball screw of FIG. 1.

In this assembling method of the ball screw, the above ball screw 1 is used, and the two nuts 21 and 22 are brought into contact with each other in a state where the two nuts 21 and 22 are assembled to the threaded shaft 10, as illustrated in FIG. 2. The steps are as follows. First, the entirety of the sealing member 6 is accommodated in the counterbore 5 formed on the second nut 22 of the two nuts 21 and 22, as illustrated in FIG. 2 and FIG. 3. Next, while making the two nuts face each other and interposing the spacer 40 therebetween in this state, any of the nuts 21 and 22 is rotated to bring the two nuts 21 and 22 into contact with each other, as illustrated in FIG. 4.

Figure 4:
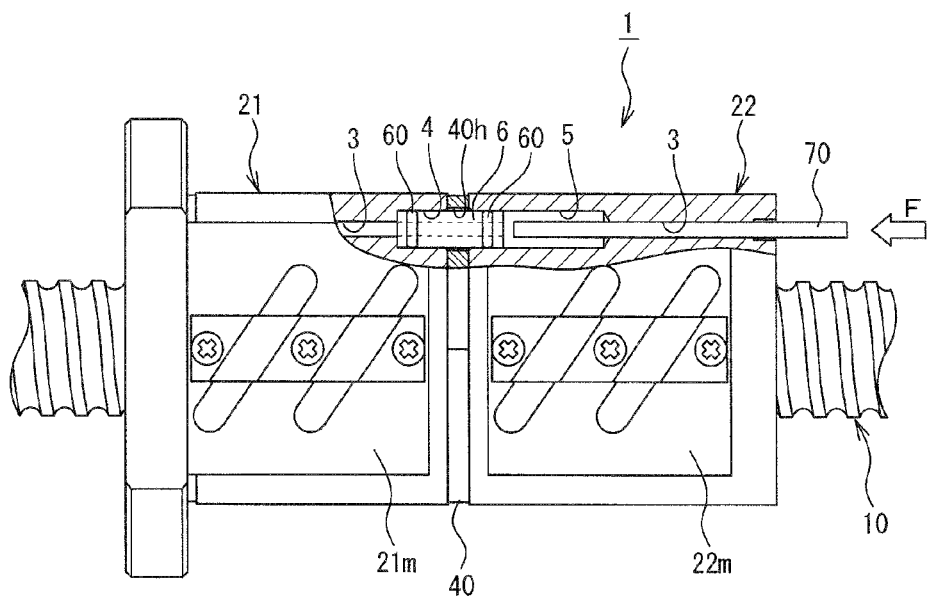
FIG. 4 is a view illustrative of the assembling method of the ball screw of FIG. 1.

Then, in a state where the counterbores 4 and 5 of the trough-holes 3 of the adjoining nuts 21 and 22 face each other as illustrated in FIG. 4, the sealing member 6 is pushed from the end part of the counterbore 5 formed on the second nut 22, the end part being opposite to a contact side between the nuts 21 and 22, so that the sealing member 6 is pressed into the counterbore 4 of the first nut 21 facing the second nut 22, until the sealing member 6 hits the bottom of the counterbore 4. At this time, as illustrated in FIG. 4, it becomes easy to push the sealing member 6 into the counterbore 4 of the first nut 21 facing the sealing member 6 by using a round bar (a pushing jig) 70 formed to have an external diameter such that the round bar 70 can be inserted in the through-hole 3 and can push the end part of the sealing member 6 (indicated by reference sign F in FIG. 4). Therefore, the sealing member 6 pushed into the counterbore 4 of the first nut 21 until the sealing member 6 hits the bottom of the counterbore 4 is located at the position to link the adjoining nuts 21 and 22, and its position is held by the elasticity of the two O-rings 60.

Next, the operation and the advantageous effect of the present ball screw and the present assembling method of the ball screw will be described.

According to the ball screw 1, the counterbores 4 and 5 of the through-holes 3 of the adjoining nuts 21 and 22 are respectively formed on the opposing end faces of both of the adjoining nuts 21 and 22. The ring-shaped sealing member 6 having the two O-rings 60 is inserted into the counterbores 4 and 5. The two O-rings 60 are fitted on the ring-shaped sealing member 6 from the outside such that the two O-rings 60 are located within the counterbores 4 and 5 of the adjoining nuts 21 and 22, respectively. The counterbores 4 and 5 are formed such that the depth D2 of the counterbore formed on the second nut 22 as the one of the nuts is larger than the total length L of the sealing member 6. Therefore, the entirety of the sealing member 6 can be accommodated.

Then, the circumferential positions of the counterbores 4 and 5 of the adjoining nuts 21 and 22 are arranged to face each other at positions where the desired preload is exerted. Therefore, the two nuts 21 and 22 can be located at the positions where the desired preload is exerted, by bringing the nuts 21 and 22 into contact with each other in a state where the entirety of the sealing member 6 is accommodated in the counterbore 5 formed on the second nut 22 as the one of the nuts.

Then, since the counterbores 4 and 5 are formed at ends of the through-holes 3, the sealing member 6 can be pushed in a state where the counterbores 4 and 5 of the trough-holes 3 of the adjoining nuts 21 and 22 face each other, from the end part of the counterbore 5 formed on the second nut 22 as the one of the nuts, the end part being opposite to the contact side between the nuts 21 and 22 and located at the end of the through-hole 3 formed in the second nut 22, so that the sealing member 6 is pressed into the counterbore 4 of the first nut 21 as the other of nuts facing the second nut 22. Therefore, the workability is improved when the adjoining nuts 21 and 22 are brought into contact with each other in a state the nuts 21 and 22 are assembled to the threaded shaft 10. Additionally, there is no possibility of shearing of the O-ring, resulting in a degradation of the sealing performance. Additionally, the position of the sealing member 6 can be held by the two O-rings 60. Then, it is not necessary to detach each of the nuts 21 and 22 from the threaded shaft 10. And it is possible to surely seal the coolant to prevent the leakage between the plurality of nuts 22 and 22.

Additionally, in the assembling method of the ball screw 1, the above ball screw 1 is used. The plurality of nuts 21 and 22 are assembled to the threaded shaft 10. The second nut 22 as the one of the adjoining nuts 21 and 22 is brought into contact with the first nut 21 as the other of nuts adjoining the second nut 22 in a state where the entirety of the sealing member 6 is accommodated in the counterbore 5 formed on the second nut 22 as the one of the nuts. Then, in a state where the counterbores 4 and 5 of the trough-holes 3 of the adjoining nuts 21 and 22 face each other, the sealing member 6 is pushed from the end part of the counterbore 5 formed on the second nut 22 as the one of the nuts, the end part being opposite to a contact side between the nuts 21 and 22 and located at the end of a through-hole 3 formed in the second nut 22, so that the sealing member 6 is pressed into the counterbore 4 of the first nut 21 as the other of nuts facing the second nut 22. Therefore, as described above, it is not necessary to detach each of the nuts 21 and 22 from the threaded shaft 10. And there is no possibility of shearing of the O-ring, resulting in a degradation of the sealing performance. Then, it is possible to surely seal the leakage of the coolant between the plurality of nuts 22 and 22. Additionally, the workability and the sealing performance of the coolant are improved when the plurality of nuts 21 and 22 are brought into contact with each other in a state the nuts 21 and 22 are assembled to the threaded shaft 10.

It is needless to say that the ball screw and the assembling method of the ball screw according to the present invention are not limited to the above embodiment, and various modifications are applicable without departing from the spirit of the present invention.

For example, the above embodiment is described as an example in which, the two through-holes 3 penetrating through each of the nuts 21 and 22 in the axial direction thereof are formed on an upper position and a lower position at equal intervals in a circumferential direction and the through-holes 3 of each of the nuts 21 and 23 are communicated with each other circularly as a whole, thereby constituting a circular flow passage. However, the present invention is not limited thereto. For example, the number of the thoughholes 3 is not limited to two, and the through-holes 3 are not necessarily formed at equal intervals.

As a specific example, four through-holes 3 penetrating through each of the nuts 21 and 22 in the axial direction thereof may be formed in a circumferential direction, and the two through-holes 3 of each of the nuts 21 and 22 are used as one set, and two sets of circular flow passages communicating circularly as a whole may be constituted. Additionally, three or more through-holes 3 may be formed in the circumferential direction, and these through-holes 3 may be communicated with one another as a whole, thereby constituting one set of circular flow passages.

Figure 11A:
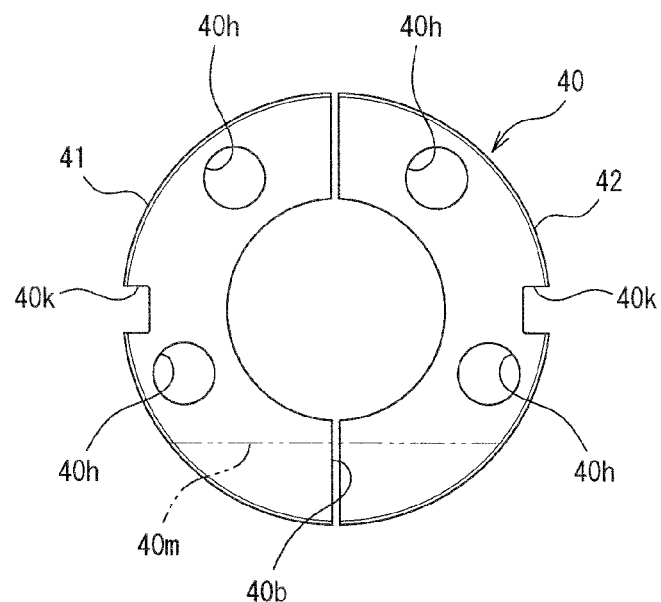
FIG. 11A is a front view illustrative of another example of the spacer illustrated in FIG. 10 (the first modified example)
Figure 11B:
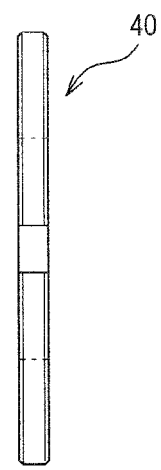
FIG. 11B is a side view illustrative of the another example of the spacer illustrated in FIG. 10 (the first modified example)
Figure 12A:
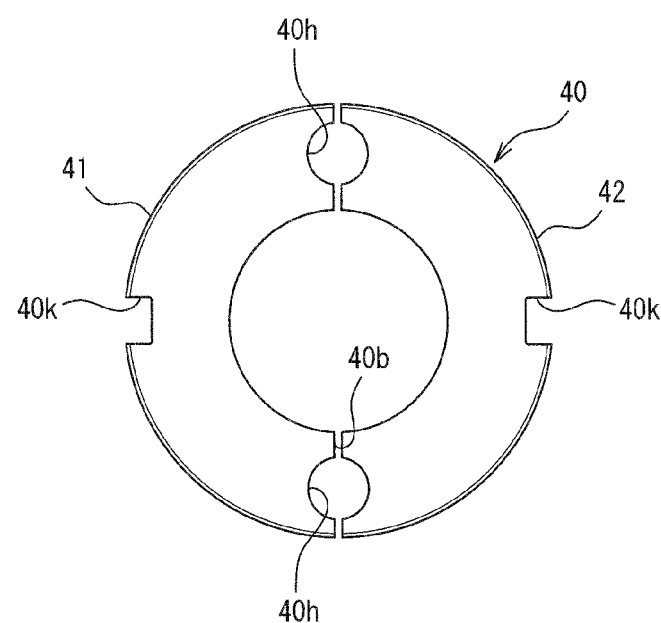
FIG. 12A is a front view illustrative of another example of the spacer illustrated in FIG. 10 (the second modified example)
Figure 12B:
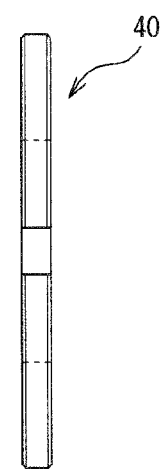
FIG. 12B is a side view illustrative of the another example of the spacer illustrated in FIG. 10 (the second modified example).

In addition, the plurality of the through-holes 3 may be arranged at unequal intervals. In this situation, as the spacer 40 illustrated in FIG. 11, for example, it is preferable that the through-holes 3 and the through-holes 40h formed in corresponding thereto should be formed at positions where the through-holes 3 and 40h avoid the mounting surfaces of the ball circulation tube of each of the nuts 21 and 22 (see the reference signs 21m as 22m illustrated in FIG. 2) and avoid the forming of a thin portion. That is, for a phantom line 40m (a position corresponding to the mounting surfaces 21m and 22m of the ball circulation tube) as illustrated in FIG. 11, it is preferable to form the two through-holes 40h of four through-holes 40h at positions between the key grooves 40k and the phantom line 40m, in this example. Additionally, it is preferable that other two through-holes 40h should be formed in the same way as the above example illustrated in FIG. 10.

Additionally, when the two through-holes 3 are formed, the dividing positions 40b of the pair of the divided spacers 41 and 42 may be used as forming positions for the through-holes 3, and the through-holes 3 may be formed at the each of the dividing positions 40b. In such a configuration, the through-hole is not formed at a thick portion (a portion between the key groove 40k and the dividing position 40b) of each of the divided spacers 41 and 42. Therefore, it is possible to prevent the formation of a thin portion in the divided spacers 41 and 42. Moreover, in such a configuration, the sealing member 6 is inserted at the dividing position 40b of the divided spacers 41 and 42. Therefore, the replacement of the spacer 40 becomes easier. Additionally, since the replacement of the spacer 40 becomes easier, the adjustment of the preload also becomes easier.

Additionally, for example, the above embodiment is described as an example of a double-nut preload type of ball screw. However, the present invention is not limited to a preload type. The present invention can be applied to any type of ball screw, as far as a plurality of nuts assembled to one threaded shaft are coupled to one another, and the nuts are cooled by flowing the coolant through through-holes formed in the nuts in the axial directions thereof. Additionally, the above embodiment is described as an example in which the two nuts are coupled to each other. However, the present invention is not limited thereto. The present invention can be applied to a configuration in which three or more nuts are coupled to one another.

Additionally, the above embodiment is described as an example in which the sealing member 6 is inserted into the counterbore 4 up to the position where the sealing member 6 hits the bottom of the counterbore 4, so that the sealing member 6 is located at the position to link the adjoining nuts 21 and 22 and its position is held by the elasticity of the two O-rings 60. However, a fixing method of the sealing member 6 is not limited thereto. A configuration fixing the sealing member 6 with a screw can be adopted as illustrated in FIG. 5, which is an enlarged view of a substantial part of a modified example.

Figure 5:
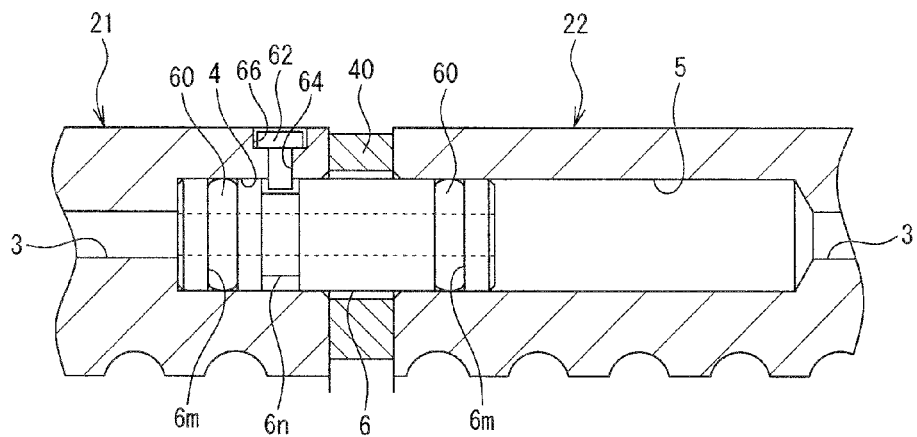
FIG. 5 is a view illustrative of a modified example of the ball screw illustrated in FIG. 1, and is an enlarged view of a substantial part.

For further details, as illustrated in FIG. 5, the example of the sealing member 6 is further provided with a ring-shaped groove 6n at a position closer to the O-ring 6 at the counterbore 4 side, in addition to the configuration of the above embodiment. Then, furthermore, a female thread 64 is formed through the nut 21 at a position facing the ring-shaped groove 6n when the sealing member 6 is located at the position where the sealing member 6 hits the bottom of the counterbore 4, and a counterbore 66 coaxial with the female thread 64 is formed. The axial direction position can be restricted by tightening a sealing member fixing screw 62 into the female thread 64 to insert the tip of the sealing member fixing screw 62 into the groove 6n.

Figure 6:
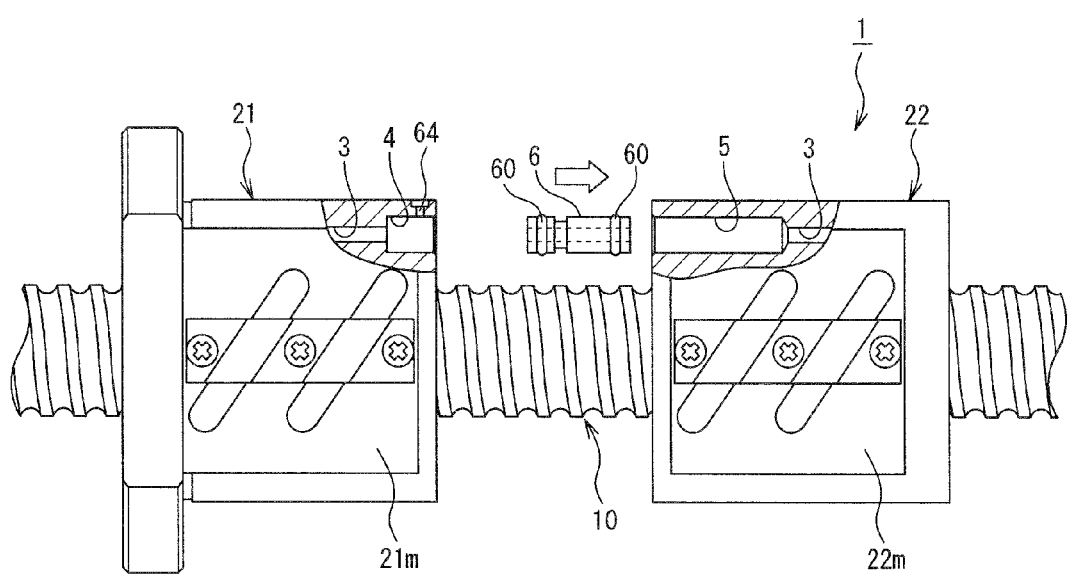
FIG. 6 is a view illustrative of an assembling method of the modified example of the ball screw of FIG. 5.
Figure 7:
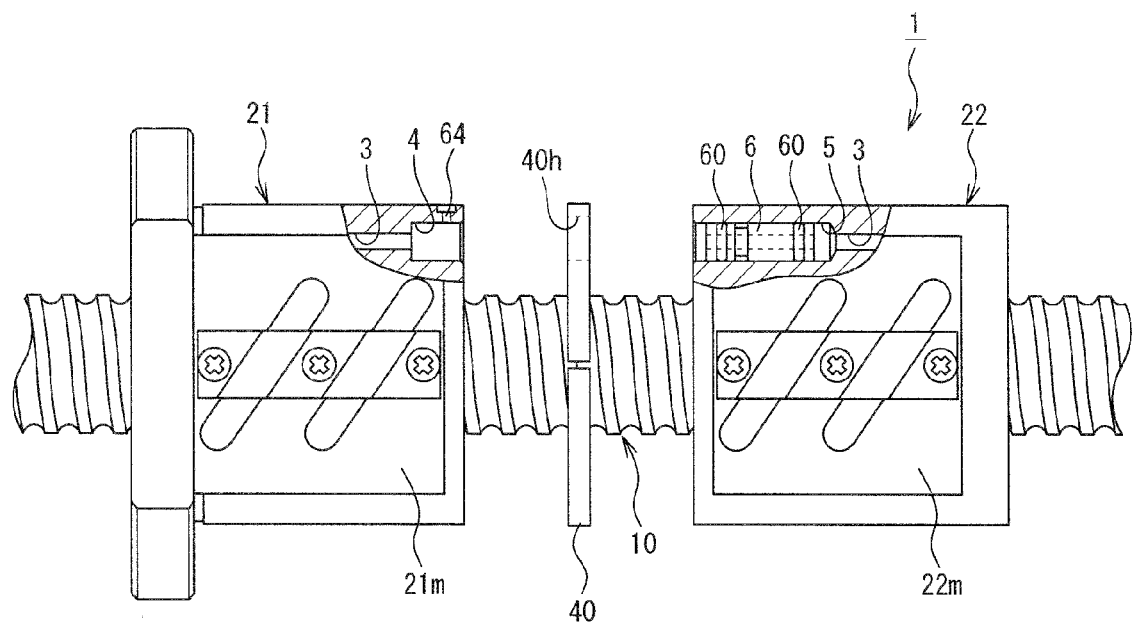
FIG. 7 is a view illustrative of the assembling method of the modified example of the ball screw of FIG. 5.
Figure 8:
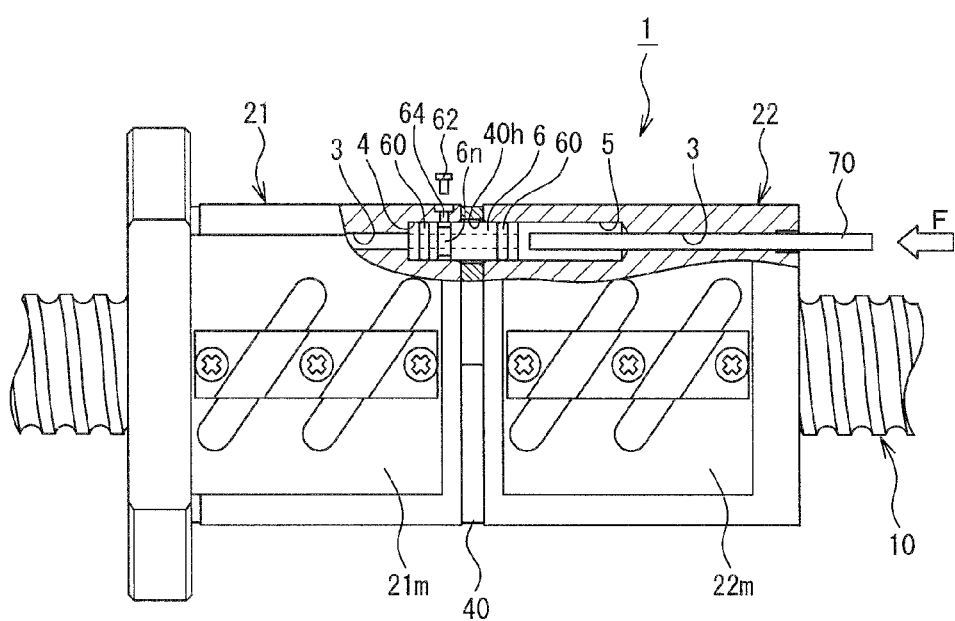
FIG. 8 is a view illustrative of the assembling method of the modified example of the ball screw of FIG. 5.

An assembling method of the ball screw of the modified example further including such a configuration is illustrated in FIG. 6 to FIG. 8. First, the entirety of the sealing member 6 is accommodated in the counterbore 5 formed on the second nut 22 of the two nuts 21 and 22. Next, while making the two nuts face each other and interposing the spacer 40 therebetween in this state, any of the nuts 21 and 22 is rotated to bring the two nuts 21 and 22 into contact with each other, as illustrated in FIG. 8.

Then, in a state where the counterbores 4 and 5 of the trough-holes 3 of the adjoining nuts 21 and 22 face each other as illustrated in FIG. 8, the sealing member 6 is pushed from the end part of the counterbore 5 formed on the second nut 22, the end part being opposite to the contact side between the nuts 21 and 22, so that the sealing member 6 is pressed into the counterbore 4 of the first nut 21 facing the second nut 22 until the sealing member 6 hits the bottom of the counterbore 4. At this time, similarly to the above embodiment, it becomes easy to push the sealing member 6 into the counterbore 4 of the first nut 21 facing the second nut 22 by using a round bar (a pushing jig) 70. Then, the axial direction position of the sealing member 6 is restricted by tightening the sealing member fixing screw 62 into the female thread 64 to insert the tip of the sealing member fixing screw 62 into the groove 6n at a position facing the female thread 64.

In the configuration of the above embodiment, the position of the sealing member 6 in the axial direction is held by only the elasticity of the two O-rings 60. Therefore, there is a possibility of displacement of the sealing member 6 toward the second nut 22 depending on the pressure of the coolant, when the coolant circulates in the cooling passage from the first nut 21 to the second nut 22. Therefore, a restriction may occur to force the circulating the coolant to flow only from the second nut 22 to the first nut 21, when the pressure of the circulating coolant is high. In contrast, according to the configuration of the above modified example, although further machining for the female thread 64 and the ring-shaped groove 6n is necessary and the working hours increase, since the tip of the sealing member fixing screw 62 can be caught by the groove 6n, the fixed state of the sealing member 6 does not depend on the flowing direction of the coolant. Therefore, the configuration of this modified example is preferable when the pressure of the coolant is high and the flowing direction of the coolant is desired to be bidirectional.

Next, another embodiment will be described with reference to FIG. 9.

Figure 9:
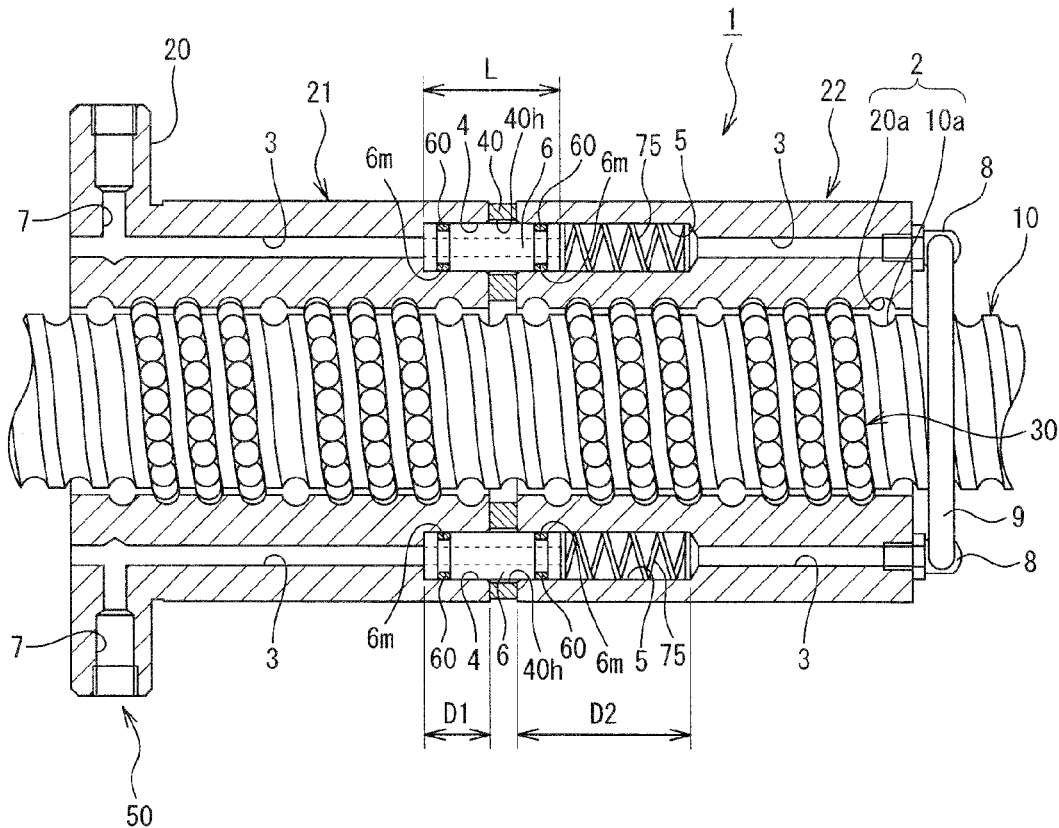
FIG. 9 is a view illustrative of another embodiment.

As illustrated in FIG. 9, this embodiment is different from the above embodiment and the above modified examples in that a coil spring (elastic member) 75 is arranged within a cylindrical space defined by the counterbore 5 of the second nut 22. The coil spring 75 is arranged so as to push the end part (the right side end part in FIG. 9) of the sealing member 6 accommodated in the two counterbores 4 and 5 toward the counterbore 4 of the first nut 21 from the counterbore 5 of the second nut 22.

Arranging the coil spring 75 eliminates the necessity of machining of the ring-shaped groove 6n, the female thread 64 and the counterbore 66, and eliminates the provision of the sealing member fixing screw 62. Additionally, the movement of the sealing member 6 due to vibration or the pressure of the coolant is prevented. Therefore, the inexpensive configuration of arranging the coil spring 75 further ensures the sealing. Additionally, the coolant can flow from either one of the two nuts 21 and 22.

REFERENCE SIGNS LIST

1 ball screw
2 rolling passage
3 through-hole
4 counterbore
5 counterbore (accommodating counterbore)
6 sealing member
7 communication hole
8 coupling nipple
9 coupling pipe
10 threaded shaft
20 flange
21 first nut
22 second nut
30 rolling element
40 spacer
50 cooling means
60 O-ring
62 sealing member fixing screw
64 female thread
66 counterbore
70 round bar (pushing jig)
75 coil spring (elastic member)

The invention claimed is:

1. A ball screw having a threaded shaft and a plurality of nuts adjoined to one another and assembled to the threaded shaft, the plurality of nuts being cooled by flowing a coolant through through-holes formed in the plurality of nuts in axial directions of the plurality of nuts, respectively, the ball screw comprising:

counterbores of the through-holes formed on opposing end faces of both of adjoining nuts of the plurality of nuts, respectively; and a ring-shaped sealing member having two O-rings and inserted into the counterbores, the two O-rings being fitted on the ring-shaped sealing member from the outside such that the two O-rings are located within the counterbores of the adjoining nuts, respectively;

wherein a first depth of a first counterbore of the counterbores is larger than a total length of the sealing member, the first counterbore being formed in one of the adjoining nuts, wherein a second depth of a second counterbore of the counterbores is smaller than the total length of the sealing member, the second counterbore being formed in the other of the adjoining nuts, and wherein circumferential positions of the first counterbore and the second counterbore of the adjoining nuts are arranged to face each other at positions where a desired preload is exerted.

2. An assembling method of the ball screw according to claim 1, the assembling method comprising:

a step assembling the plurality of nuts to the threaded shaft to bring the one of the adjoining nuts into contact with the other of the adjoining nuts in a state where an entirety of the sealing member is accommodated in the first counterbore formed on the one of the adjoining nuts; and a step of pushing the sealing member after the step of assembling, in a state where the first counterbore and the second counterbore of the trough-holes of the adjoining nuts face each other, from an end part of the first counterbore formed on the one of the adjoining nuts, the end part being opposite to a contact side between the adjoining nuts and located at an end of a through-hole of the through-holes, the through-hole being formed in the one of the adjoining nuts, to press the sealing member into the second counterbore of the other of the adjoining nuts facing the one of the adjoining nuts.

* * * * *